(12) United States Patent
Wilburn

(10) Patent No.: US 6,241,276 B1
(45) Date of Patent: Jun. 5, 2001

(54) AUXILIARY WHEEL ASSEMBLY

(76) Inventor: Helen M. Wilburn, 1384 Williams P.O. Box 141, Yazoo, MS (US) 39194

( * ) Notice: Subject to any disclaimer, the term of this patent is extended or adjusted under 35 U.S.C. 154(b) by 0 days.

(21) Appl. No.: 09/267,014

(22) Filed: Mar. 11, 1999

(51) Int. Cl.$^7$ .................................................... B62B 3/12
(52) U.S. Cl. .................. 280/659; 280/47.18; 280/47.31; 280/47.2; 280/47.33
(58) Field of Search .............................. 280/415.1, 47.18, 280/47.31, 653, 656, 659, 292, 47.2, 7.12, 504, 47.33, 63, 47.331

(56) References Cited

U.S. PATENT DOCUMENTS

| | | | |
|---|---|---|---|
| D. 329,726 | * | 9/1992 | Loveless ................................ D34/16 |
| 1,255,128 | * | 2/1918 | Bayley ................................. 280/47.2 |
| 1,735,527 | * | 11/1929 | Civik .................................... 280/47.2 |
| 1,815,825 | * | 7/1931 | Bates ................................... 280/47.33 |
| 2,742,300 | * | 4/1956 | Carver ................................. 280/47.31 |
| 2,850,289 | * | 9/1958 | Grube .................................. 280/47.23 |
| 3,893,687 | * | 7/1975 | Victor .................................. 280/47.27 |
| 4,261,596 | * | 4/1981 | Douglas ................................. 280/652 |
| 4,861,057 | * | 8/1989 | Kunkle ............................. 280/47.131 |
| 5,031,926 | * | 7/1991 | Wannamaker ........................ 280/47.2 |
| 5,033,760 | * | 7/1991 | Evans ................................. 280/47.26 |
| 5,464,234 | * | 11/1995 | Ferguson .............................. 280/5.32 |
| 5,509,681 | * | 4/1996 | Keller ................................. 280/415.1 |
| 5,806,878 | * | 9/1998 | Mroczka et al. ....................... 280/653 |
| 6,086,310 | * | 7/2000 | Lujan, III et al. .................... 414/444 |

* cited by examiner

Primary Examiner—Brian L. Johnson
Assistant Examiner—Bridget Avery

(57) ABSTRACT

An auxiliary wheel assembly for permitting utilization of a wheel barrow as a wagon. The auxiliary wheel assembly includes a pair of support arms adapted for coupling to a wheelbarrow. Each of the support arms has a plurality of uniformly spaced apertures extending through it. An axle extends through an opposed pair of the apertures of the support arms. A pair of wheels are rotatably coupled to the axle and are positioned towards opposite free ends of the axle. In an alternate embodiment, an axle extends generally horizontally and is positioned towards apertures through resting arms of an existing wheelbarrow. A pair of wheels are rotatably coupled to the axle and are positioned towards opposite free ends of the axle. A pair of generally U-shaped bolts couple the axle to the resting arms. The bolts extend around the axle. Free ends of the bolts extend through adjacent pairs of apertures of the resting arms.

3 Claims, 4 Drawing Sheets

AUXILIARY WHEEL ASSEMBLY

BACKGROUND OF THE INVENTION

1. Field of the Invention

The present invention relates to wheel assemblies and more particularly pertains to a new auxiliary wheel assembly for permitting utilization of a wheel barrow as a wagon.

2. Description of the Prior Art

The use of wheel assemblies is known in the prior art. More specifically, wheel assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 5,031,926; U.S. Pat. No. 4,061,349; U.S. Pat. No. 4,822,070; U.S. Pat. No. 3,258,275; U.S. Pat. No. 5,277,439; and U.S. Pat. No. 2,612,386.

While these devices fulfill their respective, particular objectives and requirements, the aforementioned patents do not disclose a new auxiliary wheel assembly. The inventive device includes a pair of support arms adapted for coupling to a wheelbarrow. Each of the support arms has a plurality of uniformly spaced apertures extending through it. An axle extends through an opposed pair of the apertures of the support arms. A pair of wheels are rotatably coupled to the axle and are positioned towards opposite free ends of the axle. In an alternate embodiment, an axle extends generally horizontally and is positioned towards apertures through resting arms of an existing wheelbarrow. A pair of wheels are rotatably coupled to the axle and are positioned towards opposite free ends of said axle. A pair of generally U-shaped bolts couple the axle to the resting arms. The bolts extend around the axle. Free ends of the bolts extend through adjacent pairs of apertures of the resting arms.

In these respects, the auxiliary wheel assembly according to the present invention substantially departs from the conventional concepts and designs of the prior art, and in so doing provides an apparatus primarily developed for the purpose of permitting utilization of a wheel barrow as a wagon.

SUMMARY OF THE INVENTION

In view of the foregoing disadvantages inherent in the known types of wheel assemblies now present in the prior art, the present invention provides a new auxiliary wheel assembly construction wherein the same can be utilized for permitting utilization of a wheel barrow as a wagon.

The general purpose of the present invention, which will be described subsequently in greater detail, is to provide a new auxiliary wheel assembly apparatus and method which has many of the advantages of the wheel assemblies mentioned heretofore and many novel features that result in a new auxiliary wheel assembly which is not anticipated, rendered obvious, suggested, or even implied by any of the prior art wheel assemblies, either alone or in any combination thereof.

To attain this, the present invention generally comprises a pair of support arms adapted for coupling to a wheelbarrow. Each of the support arms has a plurality of uniformly spaced apertures extending through it. An axle extends through an opposed pair of the apertures of the support arms. A pair of wheels are rotatably coupled to the axle and are positioned towards opposite free ends of the axle. In an alternate embodiment, an axle extends generally horizontally and is positioned towards apertures through resting arms of an existing wheelbarrow. A pair of wheels are rotatably coupled to the axle and are positioned towards opposite free ends of said axle. A pair of generally U-shaped bolts couple the axle to the resting arms. The bolts extend around the axle. Free ends of the bolts extend through adjacent pairs of apertures of the resting arms.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new auxiliary wheel assembly apparatus and method which has many of the advantages of the wheel assemblies mentioned heretofore and many novel features that result in a new auxiliary wheel assembly which is not anticipated, rendered obvious, suggested, or even implied by any of the prior art wheel assemblies, either alone or in any combination thereof.

It is another object of the present invention to provide a new auxiliary wheel assembly which may be easily and efficiently manufactured and marketed.

It is a further object of the present invention to provide a new auxiliary wheel assembly which is of a durable and reliable construction.

An even further object of the present invention is to provide a new auxiliary wheel assembly which is susceptible of a low cost of manufacture with regard to both materials and labor, and which accordingly is then susceptible of low prices of sale to the consuming public, thereby making such auxiliary wheel assembly economically available to the buying public.

Still yet another object of the present invention is to provide a new auxiliary wheel assembly which provides in the apparatuses and methods of the prior art some of the advantages thereof, while simultaneously overcoming some of the disadvantages normally associated therewith.

Still another object of the present invention is to provide a new auxiliary wheel assembly for permitting utilization of a wheel barrow as a wagon.

Yet another object of the present invention is to provide a new auxiliary wheel assembly which includes a pair of support arms adapted for coupling to a wheelbarrow. Each of the support arms has a plurality of uniformly spaced apertures extending through it. An axle extends through an opposed pair of the apertures of the support arms. A pair of wheels are rotatably coupled to the axle and are positioned towards opposite free ends of the axle. In an alternate embodiment, an axle extends generally horizontally and is positioned towards apertures through resting arms of an existing wheelbarrow. A pair of wheels are rotatably coupled to the axle and are positioned towards opposite free ends of said axle. A pair of generally U-shaped bolts couple the axle to the resting arms. The bolts extend around the axle. Free ends of the bolts extend through adjacent pairs of apertures of the resting arms.

Still yet another object of the present invention is to provide a new auxiliary wheel assembly that eliminates the need to lift the wheelbarrow to move it, thereby greatly reducing the risk of back strain.

Even still another object of the present invention is to provide a new auxiliary wheel assembly that permits height adjustment of the rear wheels to adapt to different loads as well as to varying heights of users.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
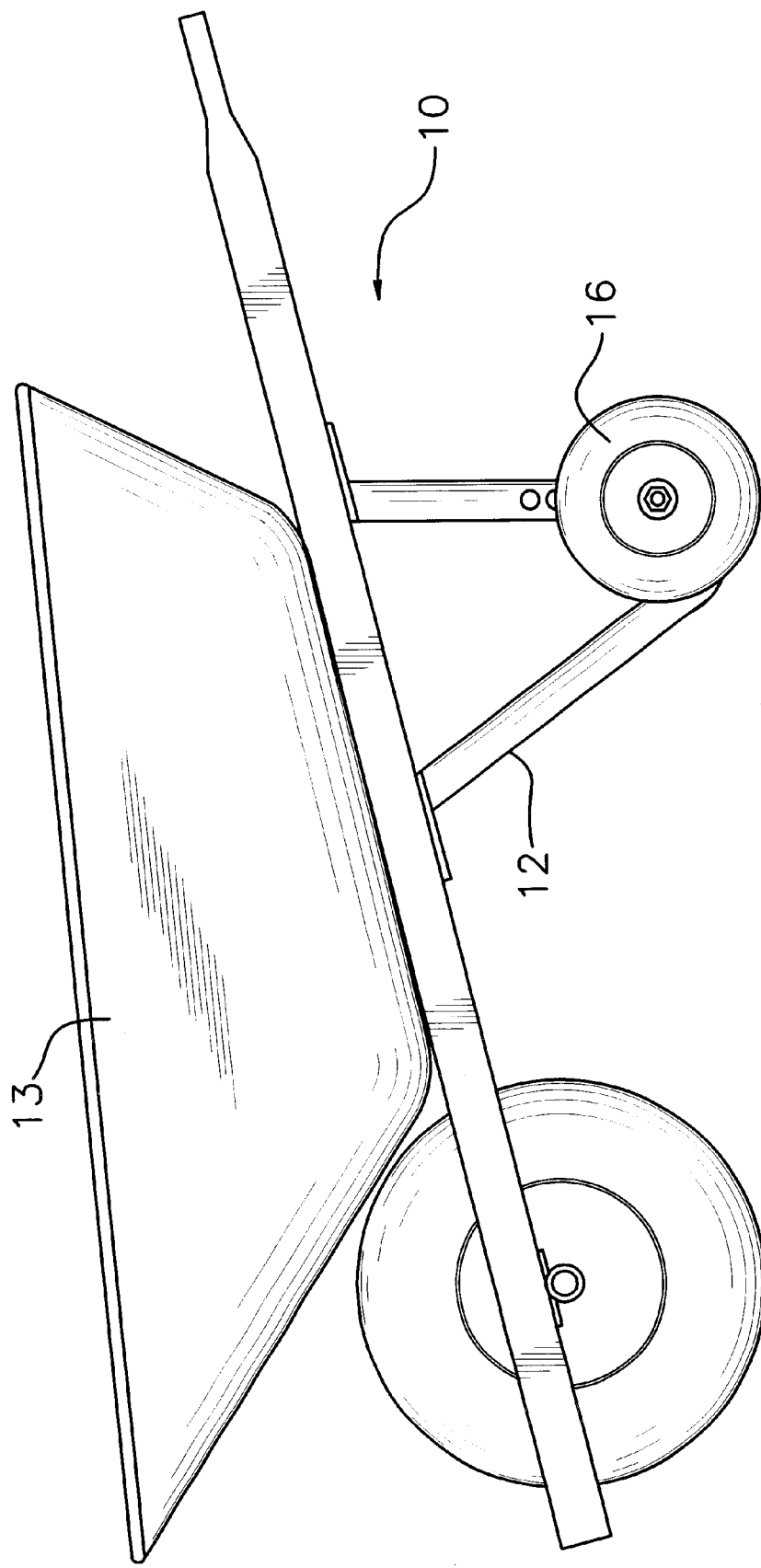
FIG. 1 is a schematic side view of a new auxiliary wheel assembly according to the present invention.

With reference now to the drawings, and in particular to FIGS. 1 through 5 thereof, a new auxiliary wheel assembly embodying the principles and concepts of the present invention and generally designated by the reference numeral 10 will be described.

As best illustrated in FIGS. 1 through 5, the auxiliary wheel assembly 10 is designed for mounting to a wheelbarrow and generally comprises a pair of support arms 12 adapted for coupling to a wheelbarrow 13. Each of the support arms has a plurality of uniformly spaced apertures 14 extending through it. An axle 15 extends through an opposed pair of the apertures of the support arms. A pair of wheels 16 arc rotatably coupled to the axle and are positioned towards opposite free ends 17 of the axle.

Figure 2:
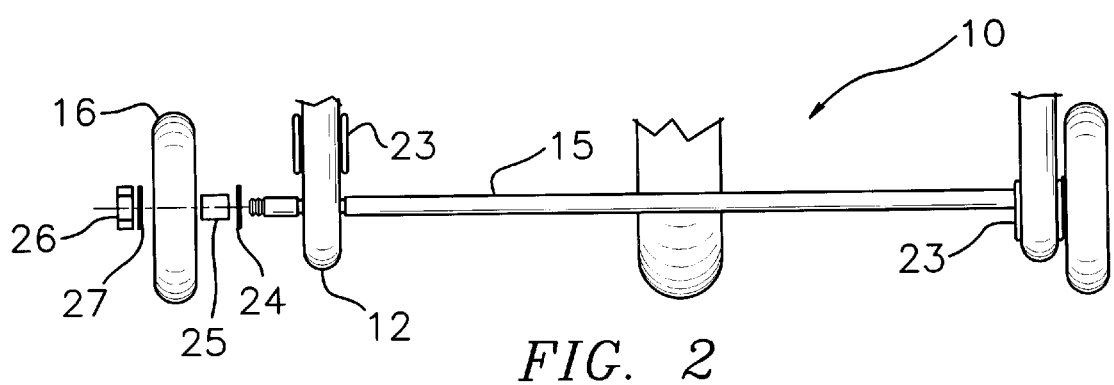
FIG. 2 is a schematic partial side view of the present invention.
Figure 3:
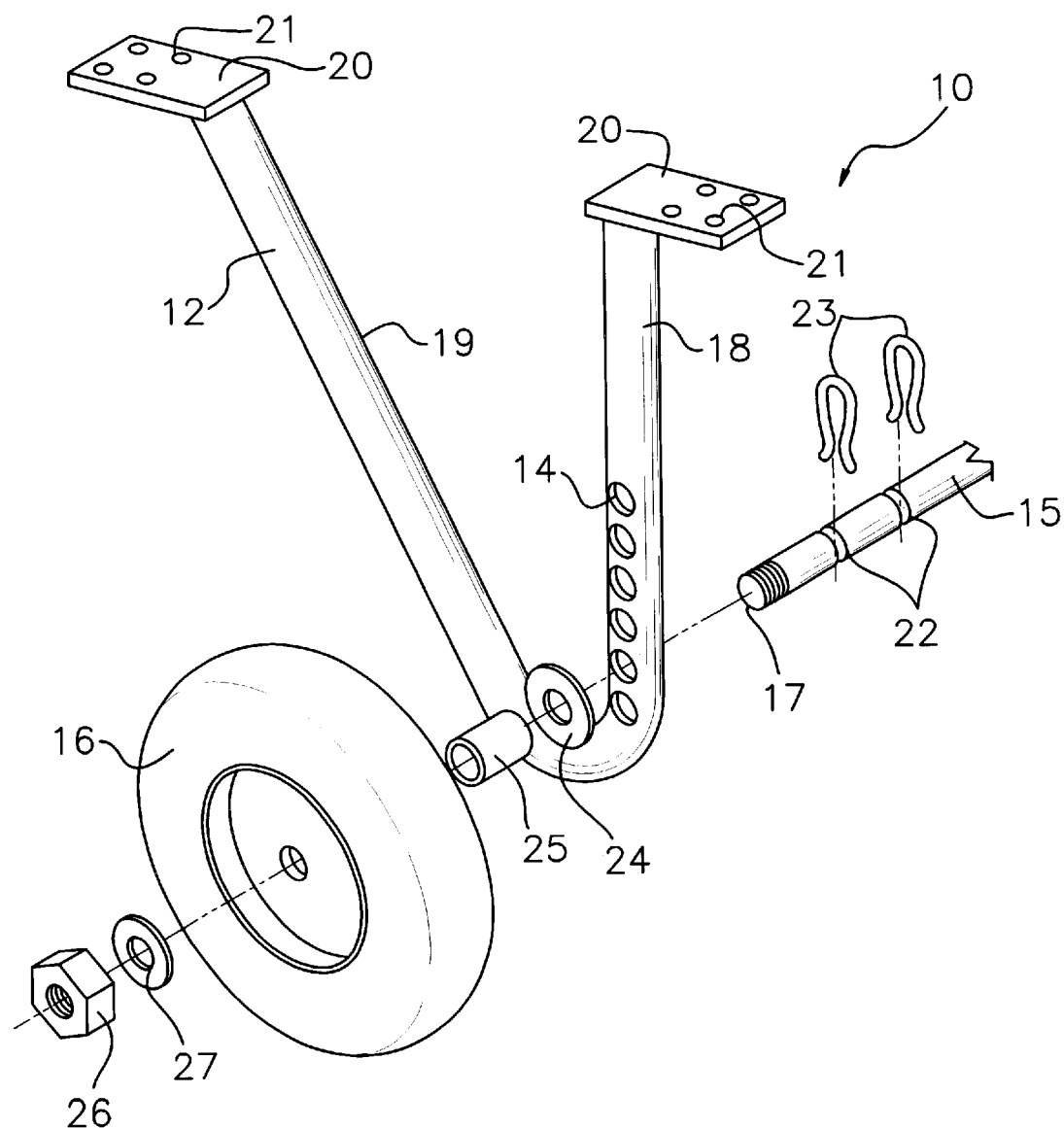
FIG. 3 is a schematic perspective view of the present invention.

Referring to FIGS. 1 through 3, it is seen that a pair of generally V-shaped support arms extend downwardly from the wheelbarrow. Each of the support arms has opposed ends coupled to the wheelbarrow and first and second portions 18,19 that are oriented at an acute angle with respect to each other.

The first portion of each of the support arms has a plurality of uniformly spaced apertures extending through it. Preferably, the apertures of one of the support arms are generally aligned with the apertures of another of the support arms such that opposed pairs of apertures are formed through which an axle can be slid. The plurality of apertures permit vertical adjustment of the axle, thereby permitting raising and lowering of the back of the wheelbarrow as well as permitting larger or smaller diameter wheels to be used.

Preferably, each of the ends of the support arm has a mounting flange 20 extending from it. The mounting flanges are coupled to the wheelbarrow. Ideally, each of the mounting flanges has a plurality of mounting holes 21 extending through it. The mounting holes are adapted for receiving a fastener therethrough to couple the flanges to the wheelbarrow.

An axle extending through an opposed pair of the apertures of the support arms. A pair of wheels are rotatably coupled to the axle and are positioned towards opposite free ends of the axle. Exemplary diameters of the wheels are about 4, 6, or 8 inches.

Preferably, the axle has a plurality of annular channels 22 extending around it. A pair of the channels are positioned towards one of the support arms and another pair of the channels are positioned towards another of the support arms. Ideally, the channels of each of the pairs of channels are positioned on opposite sides of the associated support arm.

A plurality of generally U-shaped clips 23 are removably coupled to the axle. The clips are disposed in the channels of the axle such that they are frictionally coupled to the axle. The clips help prevent sliding of the axle out of the apertures of the support arms. Only one clip could be used at each support arm, as long as both are positioned inside or both outside the support arms. However, using a pair of clips at each support arm helps prevent damage to the support arms in that lateral pivoting of the wheelbarrow will apply pressure to both support arms.

Preferably, a pair of first washers 24 extend around the axle and are positioned between the wheels and the channels of the axle. A pair of spacer sleeves 25 extending around the axle and are positioned between the wheels and the first washers. The spacer sleeves help prevent rubbing of the wheels against the support arms. The free ends of the axle are threaded. A pair of nuts 26 are threadedly coupled to the free ends of the axle. A pair of second washers 27 extend around the axle and are positioned between the wheels and the nuts. Alternatively, quick-release pins (not shown) could be used to hold the wheels onto the axle instead of nuts.

Figure 4:
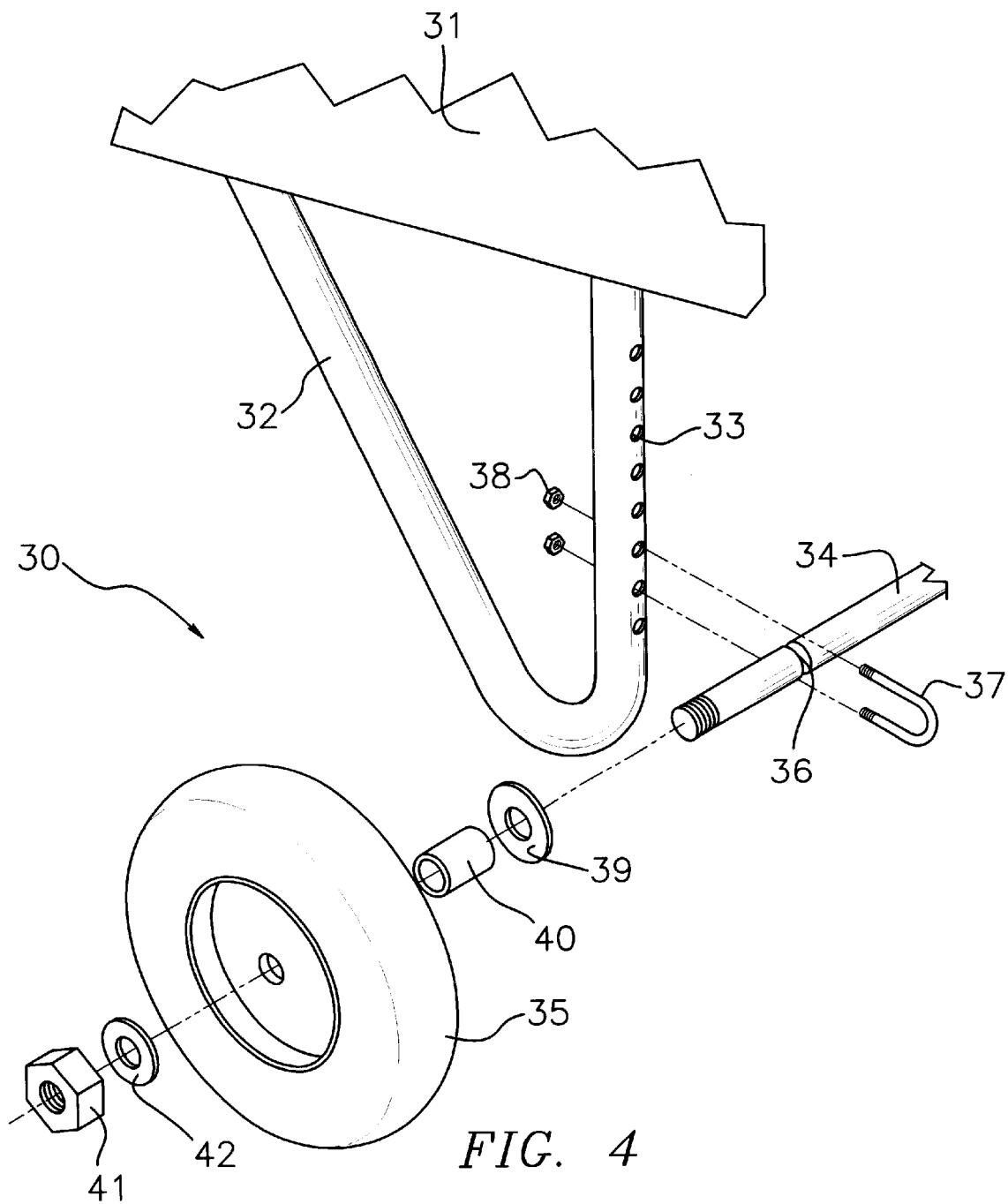
FIG. 4 is a schematic partial perspective view of an alternate embodiment of the present invention.

In a second embodiment 30, shown in FIG. 4, the wheel assembly is adapted for mounting to a wheelbarrow 31 that has a pair of generally U-shaped resting arms 32 extending downwardly therefrom. Each of the resting arms has a plurality of uniformly spaced apertures 33 extending through it. The plurality of apertures permit vertical adjustment of the axle, thereby permitting raising and lowering of the back of the wheelbarrow as well as permitting larger or smaller diameter wheels to be used.

A second axle 34 extends generally horizontally and is positioned towards the apertures of the resting arms of the wheelbarrow. A pair of wheels 35 are rotatably coupled to the second axle and are positioned towards opposite free ends of the second axle.

Preferably, the second axle has a pair of annular channels 36 extending therearound. One of the channels is positioned towards one of the resting arms and another of the channels is positioned towards another of the resting arms. Ideally, each of the channels is positioned between a pair of adjacent apertures of the associated resting arm.

A pair of generally U-shaped bolts 37 releasably couple the second axle to the resting arms. The bolts are disposed in the channels of the second axle. Free ends of the bolts extend through adjacent pairs of apertures of the resting arms. A plurality of nuts 38 are threadedly coupled to the free ends of the bolts for coupling the bolts to the resting arms.

A pair of first washers 39 extend around the second axle and are positioned between the wheels and the channels of the second axle. A pair of spacer sleeves 40 extending around the second axle and are positioned between the wheels and the first washers. The spacer sleeves help prevent rubbing of the wheels against the resting arms. The free ends of the second axle are threaded. A pair of nuts 41 are threadedly coupled to the free ends of the second axle. A pair of second washers 42 extend around the second axle and are positioned between the wheels and the nuts.

Figure 5:
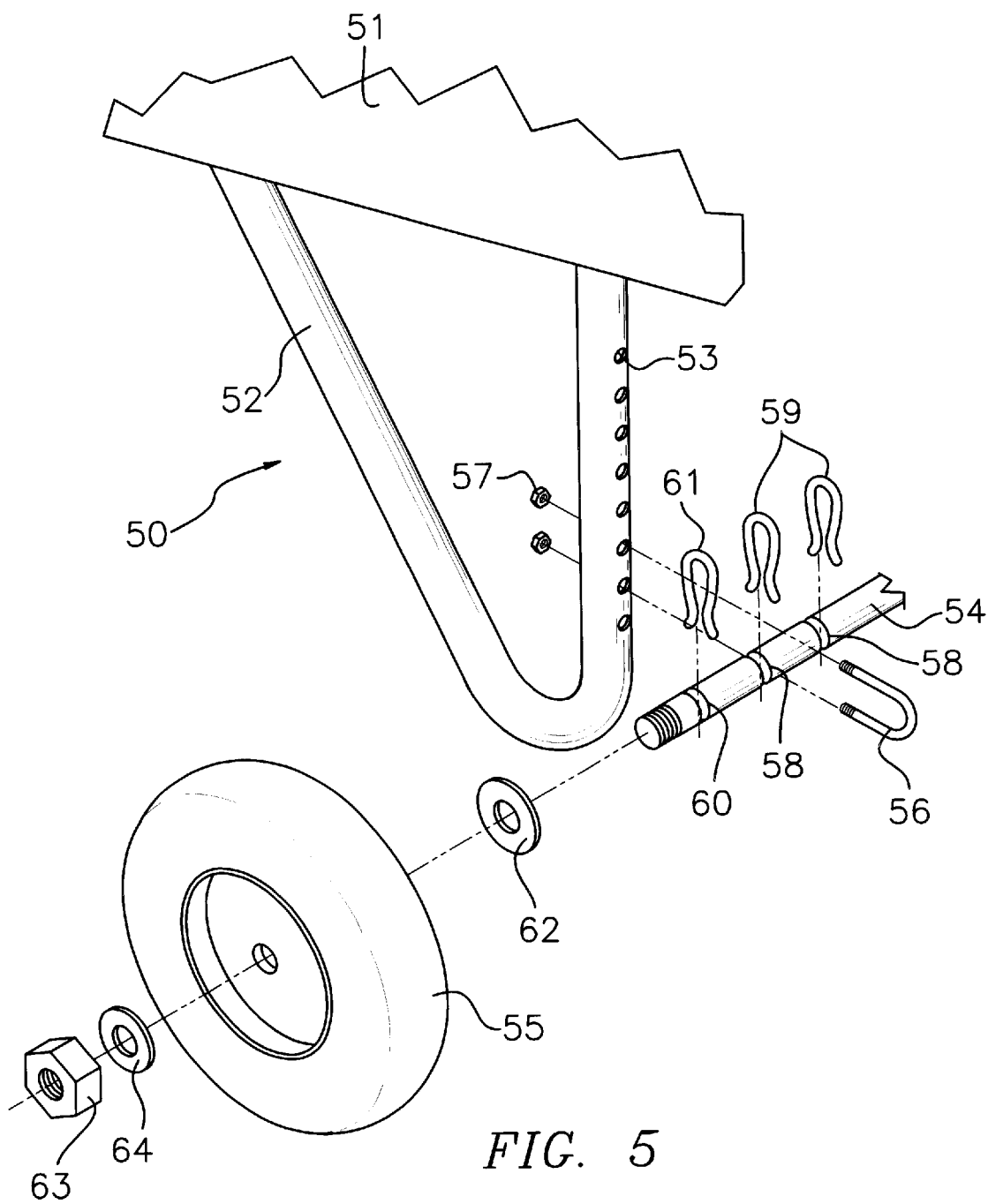
FIG. 5 is a schematic partial perspective view of an alternate embodiment of the present invention.

In a third embodiment 50, as illustrated in FIG. 5, the wheel assembly is adapted for mounting to a wheelbarrow 51 that has a pair of generally U-shaped resting arms 52 extending downwardly therefrom. Each of the resting arms has a plurality of uniformly spaced apertures 53 extending through it. The plurality of apertures permit vertical adjustment of the axle, thereby permitting raising and lowering of the back of the wheelbarrow as well as permitting larger or smaller diameter wheels to be used.

A third axle 54 extends generally horizontally and is positioned towards the apertures of the resting arms of the wheelbarrow. A pair of wheels 55 are rotatably coupled to the third axle and are positioned towards opposite free ends of the third axle.

A pair of generally U-shaped bolts 56 releasably couple the third axle to the resting arms. The bolts extend around the third axle. Free ends of the bolts extend through adjacent pairs of apertures of the resting arms. A plurality of nuts 57 are threadedly coupled to the free ends of the bolts for coupling the bolts to the resting arms.

Preferably, the third axle has a plurality of annular channels 58 extending around it. A pair of the channels are positioned towards one of the resting arms. Another pair of the channels are positioned towards another of the resting arms. Ideally, the channels of each of the pairs of channels are positioned on opposite sides of the associated resting arm.

A plurality of generally U-shaped clips 59 are removably coupled to the third axle. The clips are disposed in the channels of the third axle such that they are frictionally coupled to the third axle. The clips help prevent sliding of the axle out of the bolts. Only one clip could be used at each support arm, as long as both are positioned inside or both outside the support arms. However, using a pair of clips at each support arm helps prevent damage to the support arms in that lateral pivoting of the wheelbarrow will apply pressure to both support arms.

Also preferably, the third axle has a pair of annular spacing channels 60 extending around it. One of the channels is positioned towards one of the free ends of the third axle. Another of the channels is positioned towards another of the free ends of the third axle. Ideally, the spacing channels are spaced apart from the resting arms.

A pair of generally U-shaped spacing clips 61 are removably coupled to the third axle. The spacing clips are disposed in the spacing channels of the third axle to help prevent rubbing of the wheels against the resting arms.

Preferably, a pair of first washers 62 extend around the third axle and are positioned between the wheels and the spacing clips of the third axle. The free ends of the third axle are threaded. A pair of nuts 63 are threadedly coupled to the free ends of the third axle. A pair of second washers 64 extend around the third axle and are positioned between the wheels and the nuts.

It is to be noted that the description of the above embodiments is not intended to limit the elements and construction of an embodiment to that particular embodiment. Rather, each individual elements of any of the embodiments may be used in any combination with any of the elements of any or all of the embodiments.

To use the wheel assembly in the first embodiment, the axle is slid through a pair of apertures of the support arms of the desired height from the ground. The channels of each pair of channels of the axle are positioned on opposite sides of the associated support arm. The clips are clipped to the axle such that they are disposed in the channels. The first washers are slid onto the axle. The spacing sleeves are slid onto the axle. The wheels are mounted to the axle. The second washers are slid onto the axle. The nuts are coupled to the axle. The wheelbarrow is pushed along the ground without having to lift the back end up, as is necessary with conventional wheelbarrows.

To use the wheel assembly in the second embodiment, the second axle is positioned at the desired height from the ground. The U-shaped bolts are slid into a pair of apertures of the resting arms of the wheelbarrow such that the bolts are disposed in the channels of the second axle. The first washers are slid onto the axle. The spacing sleeves are slid onto the axle. The wheels are mounted to the axle. The second washers are slid onto the axle. The nuts are coupled to the axle.

To use the wheel assembly in the third embodiment, the third axle is positioned at the desired height from the ground. The U-shaped bolts are slid into a pair of apertures of the resting arms of the wheelbarrow above and below the third axle. The clips are placed in the channels of the axle. The spacing clips are placed in the spacing channels. The first washers are slid onto the axle. The spacing sleeves are slid onto the axle. The wheels are mounted to the axle. The second washers are slid onto the axle. The nuts are coupled to the axle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelbarrow system with improved mobility, comprising:
    a wheelbarrow having a tub, a front wheel mounted on a front of said tub, and a pair of generally U-shaped resting arms mounted on and extending downwardly from a rear of said tub in spaced relationship to said front wheel, each of said resting arms having a plurality of uniformly spaced apertures extending therethrough; and
    a removable wheel assembly comprising:
        an axle extending across said U-shaped resting, arms for orienting generally horizontally, said axle being positioned adjacent said apertures in said resting arms of said wheelbarrow;
        a pair of wheels being rotatably coupled to said axle and being positioned towards opposite free ends of said axle; and
        a pair of generally U-shaped bolts coupling said axle to said resting arms, each of said bolts extending around said axle, free ends of each of said bolts extending through adjacent pairs of apertures of one of said resting arms for securing the axle against said resting arms.

2. The wheelbarrow system of claim 1, wherein said axle has a pair of annular channels extending therearound, a first one of said channels being positioned towards a first one of said resting arms, a second one of said channels being positioned towards a second one of said resting arms, said bolts being disposed in said channels of said axle for resisting axial movement of said axle with respect to said resting arms.

3. The wheelbarrow system of claim 2, further comprising a nut being threadedly coupled to each of said free ends of said U-shaped bolts for coupling said U-shaped bolts to said resting arms;
    a pair of first washers extending around said axle each of said first washers being positioned between one of said wheels and an adjacent one of said resting arms;
    a pair of spacer sleeves, each spacer sleeve extending around said axle and being positioned between one of said wheels and one of said first washers, said spacer sleeves being for helping prevent rubbing of said wheels against said resting arms;
    a pair of second washers extending around said axle each of said second washers being positioned between one of said wheels and an adjacent one of said free ends of said axle;
    said free ends of said axle being threaded; and
    a pair of nuts, each nut being threadedly coupled to one of said free ends of said axle for holding said wheels on said axle.

* * * * *